United States Patent [19]
Bonicel et al.

[11] Patent Number: 5,763,003
[45] Date of Patent: Jun. 9, 1998

[54] METHOD OF COVERING A RIBBON OF OPTICAL FIBERS WITH A RESIN, AND APPARATUS FOR IMPLEMENTING SUCH A METHOD

[75] Inventors: Jean-Pierre Bonicel, Rueil; David Keller, Vaureal; Christopher Mc Nutt, Saint Germain En Laye, all of France

[73] Assignee: Alcatel Cable, Clichy Cedex, France

[21] Appl. No.: 536,848

[22] Filed: Sep. 29, 1995

[30] Foreign Application Priority Data

Oct. 13, 1994 [FR] France .................. 94 12224

[51] Int. Cl.$^6$ .................. B05D 5/06; B05B 5/00
[52] U.S. Cl. .................. 427/163.2; 427/358; 427/385.5; 427/521; 427/513; 427/379; 118/58; 118/67; 118/69; 118/88; 118/405; 118/407; 118/420; 118/434.2; 118/620; 118/641; 118/642; 118/643; 118/DIG. 18; 118/DIG. 19
[58] Field of Search .................. 427/163.2, 385.5, 427/513, 521, 358; 118/620, 641–643, 58, 69, 67, 88, 405, 407, 420, 434.2, DIG. 18, DIG. 19

[56] References Cited

U.S. PATENT DOCUMENTS 4,479,984 10/1984 Levy et al. .................. 427/513

FOREIGN PATENT DOCUMENTS

0357139A3 7/1991 European Pat. Off. .
WO9218892 10/1992 WIPO .

*Primary Examiner*—Janyce Bell
*Attorney, Agent, or Firm*—Sughrue, Mion, Zinn, Macpeak & Seas, PLLC

[57] ABSTRACT

A method and apparatus for covering a ribbon of optical fibers with a resin. The resin is polymerizable under the effect of UV radiation and forms a protective covering surrounding and holding the fibers. The method includes a pre-polymerization step during which the coated fibers advance through a UV irradiating chamber having a pre-polymerization ultraviolet radiation power of less than one fourth of the total power required to polymerize the resin, which is just sufficient to initiation polymerization. This step is followed by a polymerization finishing step during which the pre-polymerized ribbon is subjected to UV radiation of higher power than the radiation produced during the pre-polymerization step, which completes the polymerization process.

6 Claims, 3 Drawing Sheets

METHOD OF COVERING A RIBBON OF OPTICAL FIBERS WITH A RESIN, AND APPARATUS FOR IMPLEMENTING SUCH A METHOD

The present invention relates both to a method of covering a ribbon of optical fibers with a resin, and also to apparatus for implementing such a method.

BACKGROUND OF THE INVENTION

Ribbons of optical fibers are increasingly being used in high data rate telecommunications cables comprising a plurality (in general in the range 2 to 24) of optical fibers (each of which is formed of an optical core based on silica surrounded by optical cladding also based on silica and of lower refractive index than the core, optionally covered by a protective layer, often a colored layer, serving to distinguish the fibers from one another within the ribbon), the optical fibers being disposed parallel to one another and substantially in the same plane. The entire set of fibers is embedded in a resin for holding and protecting them. In the present invention, this resin is a resin that is polymerizable under the effect of ultraviolet radiation, i.e. the resin contains a photo-initiator reacting under the effect of ultraviolet radiation by causing polymer chains to be formed therein, thereby causing the resin to set.

On top of this resin covering, other protective resin coverings may optionally be disposed.

A conventional method of covering the set of fibers with protective resin consists in causing the fibers to advance through a coating die containing non-polymerized resin while holding the fibers parallel to one another and in a plane, and then in causing the covered set of fibers to advance through polymerization apparatus more commonly referred to as an "ultraviolet oven".

A first type of polymerization apparatus, e.g. sold by Fusion Systems, and shown diagrammatically in FIG. 1 in which it is referenced 10, operates using the following principle. The following are installed in an enclosure 11, which is in general sealed and impervious to ultraviolet radiation (so as to protect the outside environment against ultraviolet radiation), and which is provided with an inlet orifice and an outlet orifice (the orifices not being shown) through which the body to be treated (a coated ribbon 12 in this example) can pass:

- a sealed hollow "bulb" or irradiating cylinder 13 in general containing mercury vapor, and connected to an electricity source (e.g. electrodes) or to a microwave radiation source (e.g. a magnetron), not shown, for exciting the mercury contained in the irradiating cylinder 13 so as to generate ultraviolet radiation;
- an elliptically cylindrical reflector 14 having a focal axis F1 along which the irradiating cylinder is disposed, and serving to concentrate the ultraviolet radiation substantially onto an axis X along which the coated ribbon 12 advances; and
- an elliptical counter-reflector 15 whose focal axis F2 coincides with axis X, and which focuses all of the emitted radiation onto the axis X and therefore onto the coated ribbon 12.

Such an apparatus may further optionally include a quartz tube 16 whose axis coincides with the advance axis X along which the body to be treated advances, a cooling system for cooling the treatment zone by air flow (represented by arrows 19), e.g. via orifices 17 provided for that purpose in the reflectors 14 and 15, and a screen 18 interposed between the irradiating cylinder 13 and the axis X, which screen is transparent to ultraviolet radiation and absorbs microwaves when the irradiating cylinder 13 is excited by microwaves.

Thus, when the coated ribbon 12 advances through such an oven, it is subjected to ultraviolet radiation which polymerizes the resin with which it is coated.

However, a problem posed by that first type of apparatus lies in the fact that the power of the radiation re-emitted by the counter-reflector 15 is lower than the power of the direct radiation. Thus, the ribbon is not subjected to radiation power that is uniform at all points on it, so that the extent of resin polymerization varies within the covering. Those portions of the covering in which the resin is almost entirely polymerized tend to exert traction stresses on those portions of the covering in which the resin is only partially polymerized, so that the ribbons obtained are curved rather than being plane. This is a disadvantage when the ribbons are in use, for at least three major reasons:

- the stresses are not uniformly distributed within the resin covering, so that stresses are applied to the fibers contained in the ribbon; these stresses cause an increase in the attenuation of the fibers, and this is detrimental to the transmission performance levels of said fibers;
- the ribbon is less compact than when it is substantially plane; and
- the ribbon is more difficult to connect.

Furthermore, when the fibers contained in the ribbon are provided with a colored covering, said covering absorbs a portion of the ultraviolet radiation, thereby preventing it from reaching the other side of the ribbon. Given that the power of the radiation re-emitted by the counter-reflector 15 is lower than the power of the direct radiation, and that all of the power cannot pass through the ribbon, the power received on one side is higher than that received on the other side. Thus, polymerization is not identical on both sides, which is an additional cause of the resulting ribbon being curved in shape.

To solve those problems, consideration has been given to using a second type of polymerization apparatus, e.g. sold by DEFITECH, and shown diagrammatically in FIG. 2 in which it is referenced 20. Such apparatus operates using the following principle. A tubular irradiating cylinder 23 provided with an axial through hole 24 and having a double wall 25 is disposed inside an enclosure 21 which is shown partially cut away, which may be tubular for example, which is in general impervious to ultraviolet radiation, and which is provided with an inlet orifice and an outlet orifice (the orifices not being shown) through which a coated ribbon 22 can pass. The space between the two walls 25 is filled with a material which generates ultraviolet radiation by being excited by means of microwaves.

The product to be polymerized advances through the irradiating cylinder 23 via the through hole 24 provided therein for this purpose. Since the irradiating cylinder 23 is tubular, and because the ultraviolet radiation source occupies the entire space between the walls 25 of said irradiating cylinder, thereby surrounding the entire axial through hole 24, the radiation is uniform in said hole; so polymerization is uniform, regardless of the exact place at which the ribbon 22 is advancing through the irradiating cylinder 23. Furthermore, that type of apparatus makes it possible to avoid using reflectors, which absorb a large portion of the power of the radiation emitted by the irradiating cylinder.

That apparatus may also optionally include a tube (26) made of quartz (or of any other material that is transparent to ultraviolet radiation) whose axis coincides with the advance axis X along which the ribbon 22 advances, and an

3 outer cooling jacket (not shown) for cooling by means of a silicone oil (whose flow is represented by arrows 29).

Unfortunately, such apparatus also poses certain problems.

Given that the ribbon to be polymerized advances directly facing the ultraviolet radiation source, the infrared radiation that is inevitably emitted together with the ultraviolet radiation reaches the ribbon at very high power.

Infrared radiation is detrimental because it overheats the covering to be polymerized, thereby causing the ribbon to be curved, and thus imparting micro-stresses to the individual fibers once the ribbon has polymerized. Such micro-stresses increase the attenuation of the fibers. The problems posed are therefore identical to those posed by apparatus of the first type.

OBJECTS AND SUMMARY OF THE INVENTION

An object of the present invention is therefore to provide a method of covering a ribbon of optical fibers with a resin, while enabling ribbons that are substantially plane to be obtained.

Another object of the present invention is to provide such a method in which the covering is not overheated.

To these ends, the present invention provides a method of covering a ribbon of optical fibers with a resin, the ribbon comprising a plurality of optical fibers disposed parallel to one another and substantially in the same plane, said resin being polymerizable under the effect of ultraviolet radiation, and being intended to form a protective covering surrounding and holding said fibers, said method comprising the following operations:

coating said fibers disposed parallel to one another in their plane with said resin in the non-polymerized state; and polymerizing said resin by exposing the fibers coated in this way to ultraviolet radiation;

wherein said polymerization is performed in at least two steps, namely:

a pre-polymerization step during which said coated fibers advance inside an irradiating cylinder that is circularly symmetrical about an axis and through a suitable through hole in said irradiating cylinder, said irradiating cylinder generating uniform ultraviolet radiation in said hole, the power of the pre-polymerization ultraviolet radiation being less than one fourth of the total power required to polymerize said resin, so as to be just sufficient to initiate polymerization of said resin, so that a pre-polymerized ribbon is obtained, without the infrared radiation that is emitted together with said ultraviolet radiation overheating said resin; and at least one polymerization-finishing step during which said pre-polymerized ribbon is subjected to ultraviolet radiation of higher power than the radiation produced by said pre-polymerization irradiating cylinder, so as to complete the polymerization of said resin.

The method of the invention makes it possible for an apparatus of the above-mentioned second type to be used to perform pre-polymerization only, i.e. it can be used at a power level that is much lower than the power required to perform full polymerization, the lower power being sufficient to polymerize the resin to the extent where it takes up a substantially plane shape that it then retains during the polymerization-finishing step.

Furthermore, since the pre-polymerization power is relatively low, the power of the interfering infrared radiation is also low, so that no overheating occurs.

4

Advantageously, with the method of the invention, the treatment time is not increased by adding the pre-polymerization step since both the pre-polymerization apparatus and the polymerization apparatus can be disposed in series, and the transit time during which the ribbon passes through the pre-polymerization apparatus is no longer than that required for polymerization.

The present invention also provides apparatus for implementing the above-described method.

BRIEF DESCRIPTION OF THE DRAWINGS

Other characteristics and advantages of the present invention will appear on reading the following description of the method of the invention and of an implementation of said method, given by way of non-limiting example and with reference to the accompanying drawings, in which.

MORE DETAILED DESCRIPTION

Figure 1:
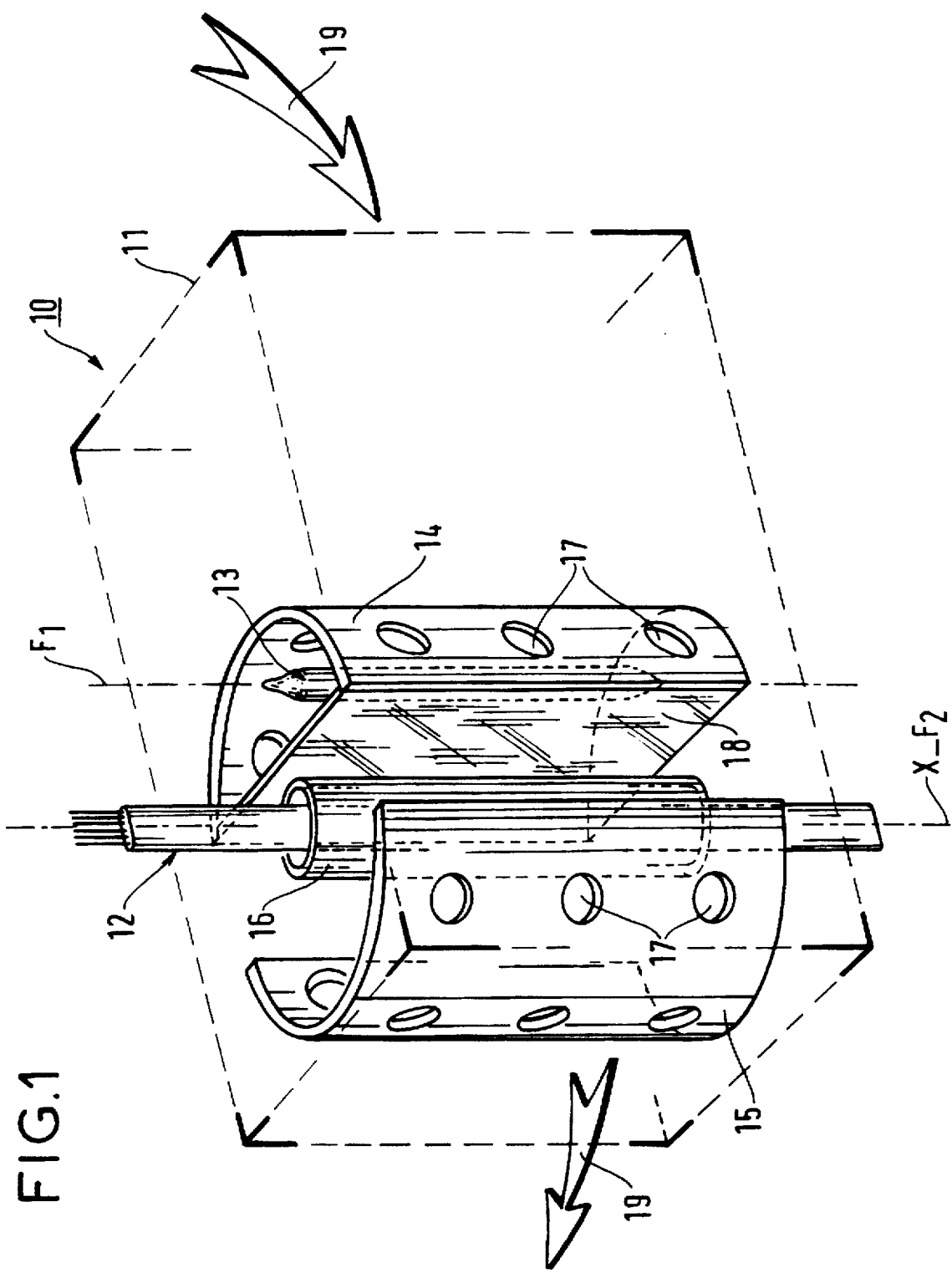
FIG. 1 is a diagrammatic perspective view of apparatus of the first known type (having reflectors)
Figure 2:
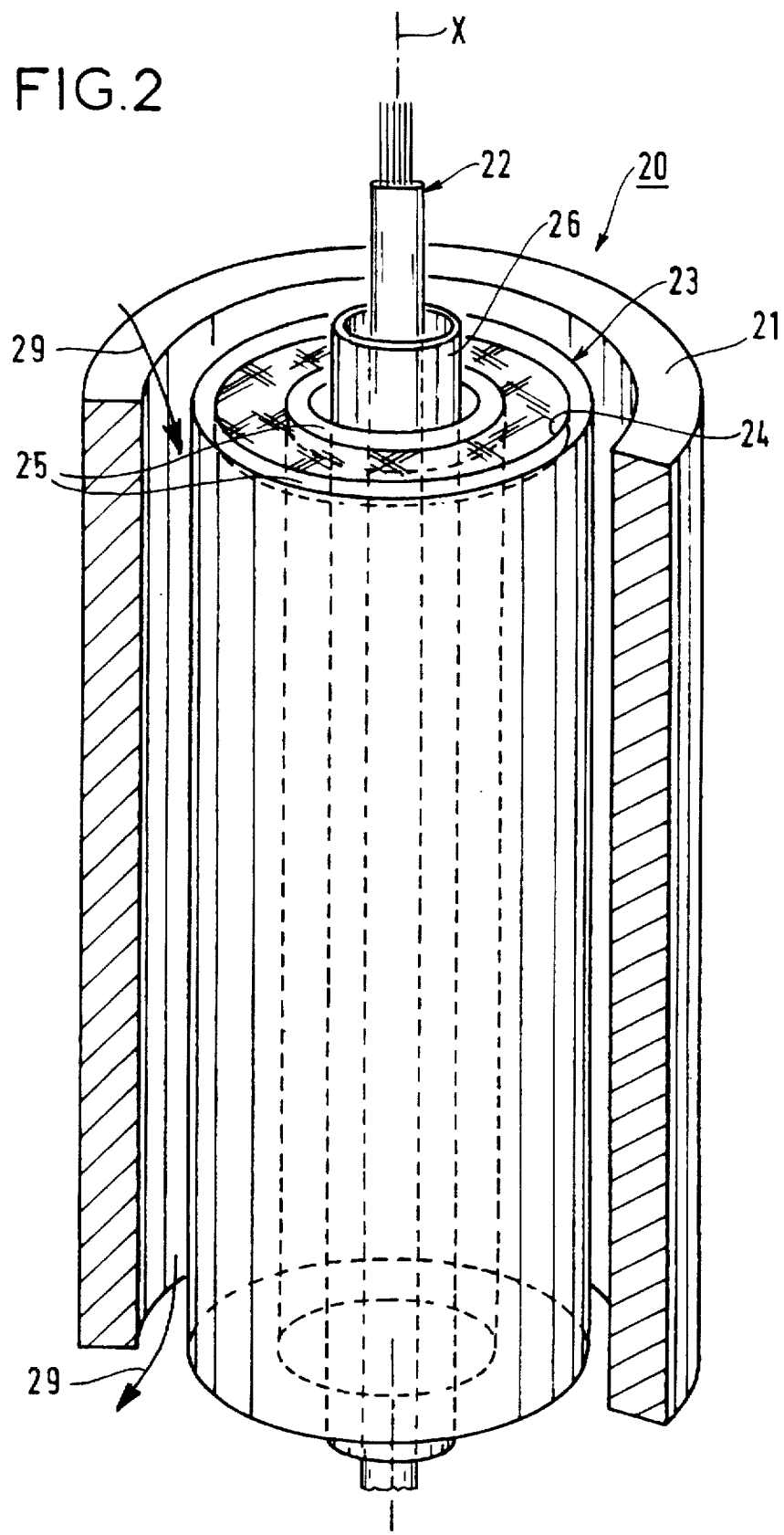
FIG. 2 is a diagrammatic perspective view of apparatus of the second known type (having a tubular irradiating cylinder)

FIGS. 1 and 2 are described above in the description of the state of the art.

Figure 3:
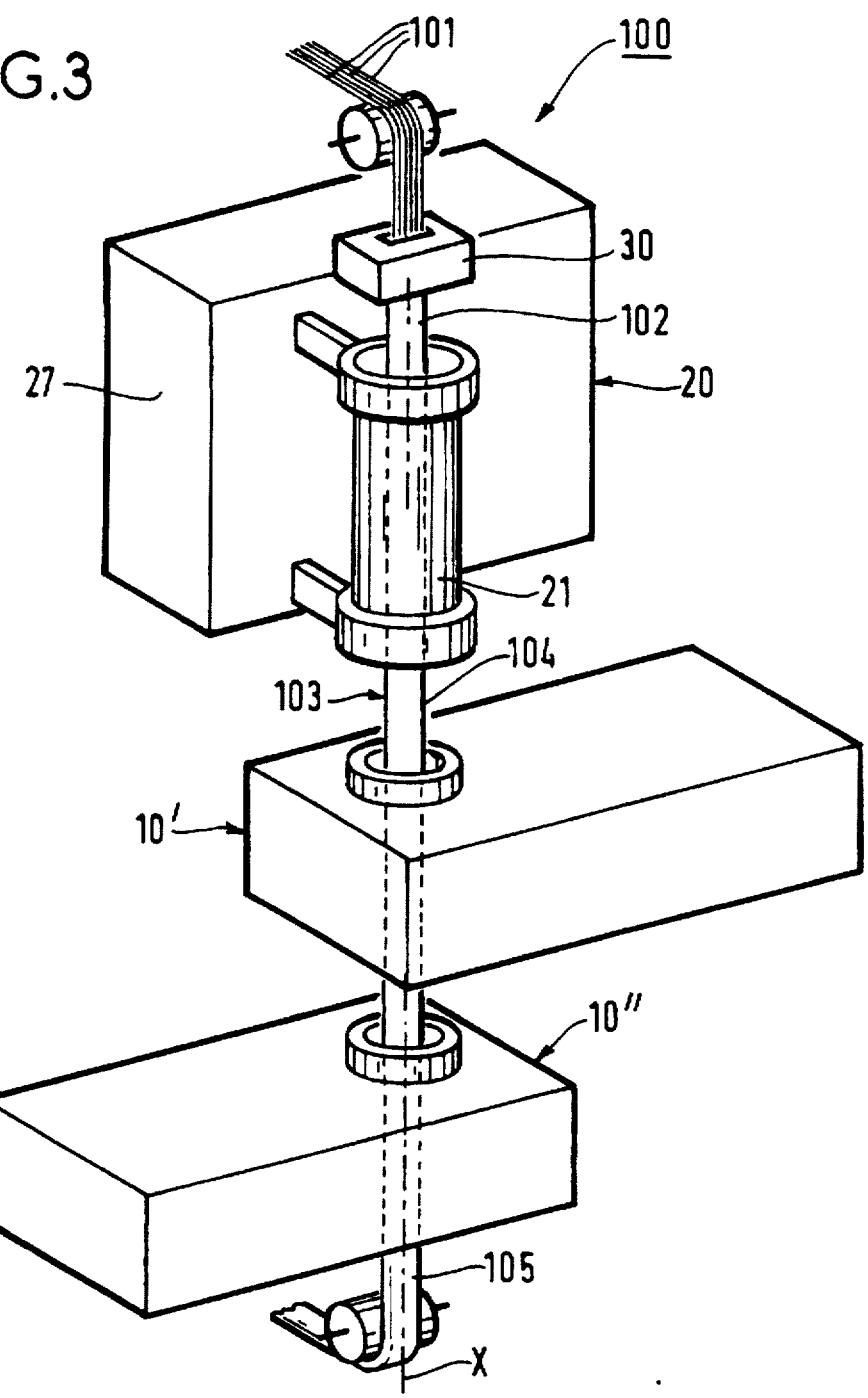
FIG. 3 diagrammatically shows apparatus for implementing the method of the invention.

The apparatus 100 shown in FIG. 3 includes the following disposed in succession: a coating die 30, a pre-polymerization oven that is identical to the oven 20 shown in FIG. 2, and two polymerization-finishing ovens that are identical to the oven 10 shown in FIG. 1, and that are referenced 10' and 10".

Naturally, the number of polymerization-finishing ovens used need not be two, depending on the type of ribbon to be treated, and on the thickness of the protective covering of resin. For reasons of clarity, only two of such apparatuses are shown, and it is assumed in the remainder of the description that polymerization requires only two polymerization-finishing ovens.

The apparatus 100 is described below in more detail.

The coating die 30 is a conventional die: the six optical fibers 101 of the ribbon to be obtained are held parallel to one another and substantially in the same vertical plane, and they pass through the die 30 containing liquid resin, in the non-polymerized state, so that, by the time they are output from the die 30, they are coated with the resin. The product output from the die 30 is referred to below as the "coated ribbon" and it is referenced 102.

The coated ribbon 102 then goes on to the pre-polymerization oven 20.

The enclosure 21 has an outside diameter of about 50 mm, and the irradiating cylinder 23 has an outside diameter of 30 mm and a length of 300 mm. The axial through hole 24 in the irradiating cylinder 23 has a diameter equal to 20 mm.

For example, the space between the two walls 25 is filled with metal vapor of mercury and of iron in a carrier gas such as argon, which, when excited by means of micro-waves via a magnetron 27 (see FIG. 3) connected to the two ends of the irradiating cylinder 23 along axis X, generates ultraviolet radiation distributed uniformly in the through hole 24.

The coated ribbon 102 advances substantially along axis X, and it is subjected to pre-polymerization in the through hole 24 in the irradiating cylinder 23, so that the resin with which it is coated by the time it is output from the die 30 starts polymerizing in the oven 20. Since this pre-polymerization occurs uniformly because of the properties of the oven 20, the "pre-polymerized ribbon" obtained at the output of the oven 20 and covered with a covering of pre-polymerized resin 104 is not curved.

The pre-polymerization is just sufficient to ensure that the covering 104 takes up a substantially plane shape, but it is insufficient for polymerization to be complete at the output of the oven 20, i.e. the power of the ultraviolet radiation in the oven 20 is low. This prevents the infrared radiation that coexists with the ultraviolet radiation from having power that is too high and that is detrimental to the quality of the ribbon: although, when the power is low, infrared radiation still exists in the apparatus 20, its effect is negligible.

The pre-polymerized ribbon 103 then passes successively through the two polymerization-finishing ovens 10' and 10".

The pre-polymerized ribbon 103 advances substantially along axis X. Inside the ovens 10' and 10", it is subjected to ultraviolet radiation of high power (higher than the power of the ultraviolet radiation in the pre-polymerization oven 20) so that the covering 104 is fully polymerized. The final ribbon obtained at the output of the oven 10" is referenced 105.

By being subjected to pre-polymerization in the oven 20, the ribbon is made stiff enough to retain its plane shape during polymerization in the ovens 10' and 10", so that the drawbacks of the ovens 10 and 20 when they are used singly to perform full polymerization are avoided when pre-polymerization is performed with the oven 20, and polymerization-finishing is performed with the ovens 10' and 10".

In this way, a ribbon is obtained that is considerably more plane than the ribbons obtained by performing full polymerization either in oven 10 or in oven 20.

Figure 4:
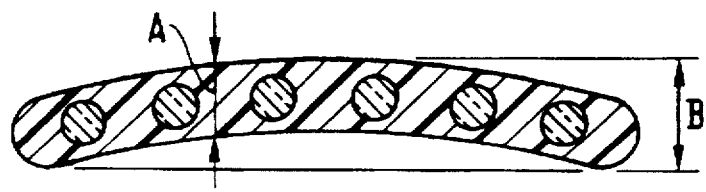
FIG. 4 is a cross-section through a curved ribbon.

With reference to FIG. 4 which is a section view through a curved ribbon, and in which the magnitude A represents the cross-sectional thickness of the curved ribbon, and the magnitude B represents the distance between two planes delimiting the curved ribbon, measurements taken on ribbons obtained by means of the method of the invention show that the ratio A/B is greater than 97% for a ribbon obtained by means of the method of the invention, whereas this ratio is in the vicinity of 80% for ribbons obtained using known methods.

The method of the invention thus makes it possible to achieve a non-negligible improvement in the quality of the ribbons obtained.

Moreover, since the pre-polymerization step and the polymerization-finishing step can be performed in series, and since the pre-polymerization step requires the ribbon to be present in the oven 20 for substantially the same length of time as is necessary for polymerization-finishing, the method of the invention does not reduce the efficiency of the covering operation.

An implementation of the method of the invention using the above-described apparatus is described below. Naturally, this implementation is given merely by way of example.

The material that is to be polymerized and that constitutes the covering of a six-fiber ribbon of optical fibers is a "quick-polymerizing" resin. Polymerizing such a resin requires a total ultraviolet radiation power of about 8,000 W, with a speed of advance through the polymerization apparatus of about 220 m/min.

Given all these magnitudes, with apparatus implementing the method of the invention, power approximately in the range 1,000 W to 2,000 W is applied in the oven 20. This power corresponds to half the maximum power that can be obtained with such an oven, and at the most one fourth of the total power required to polymerize the resin.

Then, in the oven 10', power of about 2,000 W is applied, also corresponding to half the maximum power of the oven, and finally, in the oven 10", power of 4,000 W is applied.

In practice, the more polymerized the resin, the better it withstands deformations that might occur because apparatuses of the first type are used. That is why power can be gradually increased therein.

Naturally, the present invention is not limited to the above-described implementation.

In particular, for the pre-polymerization apparatus, any apparatus may be chosen that enables radiation to be obtained that is uniform about the advance axis, and in particular any irradiating cylinder that is circularly symmetrical about said advance axis, and that is provided with a suitable through hole.

Furthermore, the polymerization-finishing apparatus(es) may be of any known type, and not necessarily excited by means of a magnetron. For example, they may be excited by means of electrodes.

In addition, in order to perform polymerization-finishing, it is possible to use one or more apparatuses of the same type as that used for pre-polymerization. In which case, the power must be set so as to avoid the detrimental effect of infrared radiation. This is not a disadvantage because polymerization has already started during pre-polymerization, so that a lower power is necessary for finishing polymerization.

For finishing polymerization, it is possible to use a plurality of apparatuses of the first type or of the second type, or a combination of the two types.

Naturally, the ribbon may include more than six optical fibers, and in general in the range 2 optical fibers to 24 optical fibers.

Any means may be replaced with equivalent means without going beyond the ambit of the invention.

We claim:

1. A method of covering a ribbon of optical fibers with a resin, the ribbon comprising a plurality of optical fibers disposed parallel to one another and substantially in the same plane, said resin being polymerizable under the effect of ultraviolet radiation, and being intended to form a protective covering surrounding and holding said fibers, said method comprising the following operations:

coating said fibers disposed parallel to one another in scud plane with said resin in the non-polymerized state; and polymerizing said resin by exposing the fibers coated in this way to ultraviolet radiation utilizing the steps of:

a pre-polymerization step during which said coated fibers advance inside an irradiating cylinder that is circularly symmetrical about an axis and through a suitable through hole in said irradiating cylinder, said irradiating cylinder generating uniform ultraviolet radiation in said hole, the power of the pre-polymerization ultraviolet radiation being less than one fourth of the total power required to polymerize said resin, so as to be just sufficient to initiate polymerization of said resin, so that a pre-polymerized ribbon is obtained, without the infrared radiation that is emitted together with said ultraviolet radiation overheating said resin; and at least one polymerization-finishing step during which said pre-polymerized ribbon is subjected to ultraviolet radiation of higher power than the radiation produced by said pre-polymerization irradiating cylinder, so as to complete the polymerization of said resin.

2. A method according to claim 1, wherein said irradiating cylinder is tubular, and wherein said coated fibers advance substantially along the axis of the tube forming said irradiating cylinder.

3. An apparatus for covering a ribbon of optical fibers with a resin, said apparatus including a resin-coating die, and ultraviolet-radiation polymerization means disposed at the output of said die, wherein said polymerization means comprise:

pre-polymerization means comprising an irradiating cylinder that is circularly symmetrical about an axis, and that generates uniform ultraviolet radiation about said axis, the power of said pre-polymerization radiation being less than one fourth of the total power required to polymerize said resin; and polymerization finishing means for generating ultraviolet radiation of higher power than the radiation produced by said pre-polymerization means, so as to finish the polymerization, said polymerization-finishing means being disposed at the output of said pre-polymerization means.

4. Apparatus according to claim 3, wherein said polymerization-finishing means comprise one or more apparatuses of the type having an irradiating cylinder excited by an excitation source so as to generate ultraviolet radiation, a reflector, and a counter-reflector, said irradiating cylinder being disposed along the focal axis of said reflector, so that the ultraviolet radiation generated by the irradiating cylinder is concentrated on the advance axis of said ribbon, said advance axis coinciding with the focal axis of said counter-reflector.

5. Apparatus according to claim 3, wherein said polymerization-finishing means comprises at least one irradiating cylinder that is circularly symmetrical about an axis and includes a means for generating UV radiation.

6. Apparatus according to claim 3, wherein said pre-polymerization means or said polymerization-finishing means are provided with a means for cooling.

* * * * *